United States Patent [19]
Kanazirev

[11] Patent Number: 6,013,600
[45] Date of Patent: Jan. 11, 2000

[54] ALUMINA BODIES CONTAINING ALKALI OR ALKALINE EARTH METAL COMPOUNDS

[75] Inventor: Vladislav I. Kanazirev, Baton Rouge, La.

[73] Assignee: LaRoche Industries Inc., Baton Rouge, La.

[21] Appl. No.: 08/862,486

[22] Filed: May 23, 1997

[51] Int. Cl.$^7$ ................................................ B01J 20/00
[52] U.S. Cl. ...................... 502/415; 427/215; 502/355
[58] Field of Search ..................... 502/415, 355; 423/628; 427/215

[56] References Cited

U.S. PATENT DOCUMENTS

| | | | |
|---|---|---|---|
| Re. 30,569 | 4/1981 | Callahan et al. | 264/13 |
| 3,222,129 | 12/1965 | Osment et al. | 23/141 |
| 3,495,954 | 2/1970 | Grimes et al. | 23/328 |
| 4,166,100 | 8/1979 | Vorobiev et al. | 423/626 |
| 4,273,735 | 6/1981 | Jacques et al. | 264/5 |
| 4,835,338 | 5/1989 | Liu | 585/823 |
| 4,952,144 | 8/1990 | Hansz et al. | 425/10 |
| 4,999,323 | 3/1991 | Sang et al. | 501/103 |
| 5,032,555 | 7/1991 | Yamanis et al. | 501/105 |
| 5,055,432 | 10/1991 | Edler et al. | 501/97 |
| 5,143,522 | 9/1992 | Gibson et al. | 51/295 |
| 5,238,611 | 8/1993 | Zamorani et al. | 264/13 |
| 5,266,243 | 11/1993 | Kneller et al. | 264/6 |
| 5,288,849 | 2/1994 | Garcin et al. | 528/482 |
| 5,316,998 | 5/1994 | Lee et al. | 502/415 |
| 5,340,781 | 8/1994 | Oda et al. | 501/127 |

FOREIGN PATENT DOCUMENTS

| | | | |
|---|---|---|---|
| 811641 | 4/1969 | Canada | 18/182 |
| 5411076 | 1/1954 | Japan . | |
| 2267096 | 11/1993 | United Kingdom . | |

*Primary Examiner*—Wayne Langel
*Attorney, Agent, or Firm*—Andrew Alexander

[57] ABSTRACT

A method of producing activated alumina bodies having alkali or alkaline earth metal compounds incorporated therein, the bodies suitable for adsorption and having increased capacity for adsorption of gases and the like. The method comprises providing a source of activated alumina powder and further providing an aqueous solution having an alkali or alkaline earth metal hydroxide and a water soluble alkali or alkaline earth metal salt of an organic compound dissolved therein. The activated alumina powder is formed into bodies which are treated with the aqueous solution to provide alumina bodies having alkali or alkaline earth metal compounds incorporated therein. The alumina bodies are heated for purposes of activation to provide said activated alumina bodies capable of having increased adsorption capacity.

32 Claims, 2 Drawing Sheets

DIFFERENTIAL THERMOGRAVIMETRIC ANALYSIS (DTG) CURVES OF ALUMINA NODULES

BAYERITE PRESENCE INDICATED BY THE DTG PEAK AT ABOUT 270C°

ALUMINA BODIES CONTAINING ALKALI OR ALKALINE EARTH METAL COMPOUNDS

BACKGROUND OF THE INVENTION

This invention relates to activated alumina and more particularly, it relates to alumina or alumina bodies containing alkali metal compounds such as sodium compounds suitable for use as an adsorbent, for example.

In forming bodies of alumina suitable for adsorbing HCl, $H_2O$, $CO_2$ or $H_2S$, for example, the bodies can be formed by several methods. For example, alumina powder can be mixed with water to make paste which is extruded to form pellets. Or, a rotating pan may be used where dry active alumina powder is added to the pan and an aqueous solution sprayed on the powder as the pan rotates. The rotating pan forms the powder and solution into spheres. In another method, spheres can be made from a viscous slurry of the activated alumina and aqueous solution using the so-called "oil drop" method.

U.S. Pat. No. 4,273,735 discloses forming spheroidal alumina shaped articles by dispersing an ungelled admixture of an alumina sol and hexamethylenetetramaine, in the form of droplets, into a liquid forming medium which is very slightly miscible with water, the medium being at a temperature of between about 50° and 105° C.; next the alumina spheres are aged at a temperature greater than about 105° C. at superatmospheric pressure, then the alumina spheres are aged in a basic medium, before washing, drying and calcining. The resultant shaped articles are useful as catalysts or catalyst carriers/supports.

U.S. Pat. No. 5,238,611 discloses a process for producing granulated particles from a powder which is insoluble in water. The formed granulated particles are substantially larger than those of the powder grains. The powder is mixed with an aqueous solution of a cellulose chosen from among methyl cellulose, hydroxypropyl methyl cellulose, etheric hydroxybutyl methyl cellulose. Then droplets of this mixture are made to fall into an aqueous solution of at least one metallic salt or metallic hydroxide which does not react with the particles.

U.S. Pat. No. 4,999,323 discloses production of ceramic powders by emulsion precipitation including contacting the emulsion with a gaseous reactant for the cation or cations that will react with the cation or cations to form a precipitate without breaking the emulsion. The gaseous reactant may be ammonia, which may be contacted with the emulsion until it reaches a pH of about 10 to 11.

U.S. Pat. No. 5,032,555 discloses a process for making zirconia-toughened alumina (ZTA) from precursor salts. The precursor salts are coprecipitated from solution to yield a gel in a liquid phase. The gel in excess of the critical temperature and pressure is dried at a temperature and pressure in excess of the critical temperature and pressure of the liquid phase to thereby convert the liquid phase to a gas. The solid particles, when separated from the gas, form a fine particulate ZTA which, upon consolidation yields near theoretical density toughened ceramics.

U.S. Pat. No. 4,166,100 discloses a method of preparing granulated activated alumina comprising decomposition of alumina trihydrate by heating, mixing of the obtained product of decomposition with water, its hydration, granulation, drying at a temperature of 20°–150° C., and calcining at a temperature of 400°–600° C., in which, according to the invention alumina trihydrate is decomposed by bringing it in contact with a bed of a solid heat carrier having the temperature of 350°–600° C., for a period of time from 0.05 to 0.5 second, to obtain an amorphous aluminum hydroxide, which is mixed with water into a suspension having the concentration of 100–500 g/liter (as $Al_2O_3$), with subsequent hydration of this product of decomposition at a temperature of 20°–100° C. and the pH of 5–12 for 0.5–10 hours; before granulation of the hydrated product of decomposition, it is treated with an acid, that can form water-soluble basic salts of aluminum, at a temperature of 20°–150° C.

U.S. Pat. No. 5,316,998 discloses an HCl adsorbent, and method of making and using the adsorbent, the adsorbent comprising an activated alumina promoted with an alkali metal oxide. The adsorbent contains at least about 5% alkali metal oxide. This patent discloses adding the alkali metal oxide using an alkali metal salt of an organic compound that decomposes at temperatures below 500° C. and liberates the organic portion.

U.S. Pat. No. 3,222,129 discloses partially dehydrated material ground so that the particles are extremely small, e.g., on the order of one to two microns. The ground particles are mixed with water to form agglomerated nodules and heated to low temperatures, e.g., about 100° C., for a period of several hours to cure the nodules. The cured material is activated by heating to a temperature in excess of 700° F. for a period of time.

U.S. Pat. No. 5,288,849 discloses alumina-based adsorbents containing at least one compound of an alkali or alkaline earth metal, wherein the alkali or alkaline earth metal values are present in an amount ranging from 15 mmole to 100 mmole per 100 g of alumina, are useful for the adsorptive purification of polyolefins prepared by the polymerization of olefins in the presence of a metallic coordination catalyst, to remove contaminating catalyst metal values therefrom with but negligible monomer/solvent isomerization.

British Patent 2,267,096 discloses a solid particulate absorbent material for removing acidic contaminants from hydrocarbons comprising sodium hydroxide and/or potassium hydroxide, alumina and/or zinc oxide, lime, and optionally, copper II oxide. A hydrocarbon containing an acidic contaminant is purified by passing the hydrocarbon through a bed of the particulate absorbent material.

U.S. Reissue Patent 30,569 discloses that hard, rounded aggregates are produced by preparing droplets of a slurry consisting of suspending liquid containing distinct particles of a solid and dropping the droplets of the slurry onto a bed of particles under conditions where the suspending liquid of the slurry droplet is removed. This technique is especially desirable for making unique fixed-bed catalysts.

Canadian Patent 811,641 discloses forming refractory spheres by dripping a resinous mixture into an alkaline solution. Other powder-related patents include U.S. Pat. Nos. 5,266,243; 5,340,781; 4,952,144; 3,495,954 and Japanese Patent 54011-076. However, there is still a great need for improved alumina bodies having increased alkali or alkaline earth metal compounds incorporated therein and an improved process for providing the same.

SUMMARY OF THE INVENTION

It is an object of the invention to provide an improved process for forming alumina bodies incorporating sodium containing compounds.

It is another object of this invention to provide an improved process for incorporating alkali or alkaline earth metals or compounds such as Na-containing compounds into alumina bodies.

Yet it is a further object of this invention to provide a process for treating activated alumina powder with an aqueous solution containing alkali or alkaline earth metal hydroxide such as sodium hydroxide.

Still, it is another object of the invention to provide a process for incorporating high levels of Na or Na compounds, for example, into activated alumina powder as it is formed into bodies or nodules by treating the bodies with a spray of an aqueous solution containing alkali or alkaline earth metal hydroxides, e.g., NaOH, at a pH greater than 11.

These and other objects will become apparent from a reading of the specification and claims appended hereto.

In accordance with these objects, there is provided a method of producing activated alumina bodies having alkali or alkaline earth metal compounds incorporated therein, the bodies suitable for adsorption and having increased capacity for adsorption of gases and the like. The method comprises providing a source of activated alumina powder and further providing an aqueous solution having an alkali or alkaline earth metal hydroxide and a water soluble alkali or alkaline earth metal salt of an organic compound dissolved therein. The activated alumina powder is formed into bodies which are treated with the aqueous solution to provide alumina bodies having alkali or alkaline earth metal compounds incorporated therein. The alumina bodies are heated for purposes of activation to provide said activated alumina bodies capable of having increased adsorption capacity.

DETAILED DESCRIPTION OF THE PREFERRED EMBODIMENTS

Figure 1:
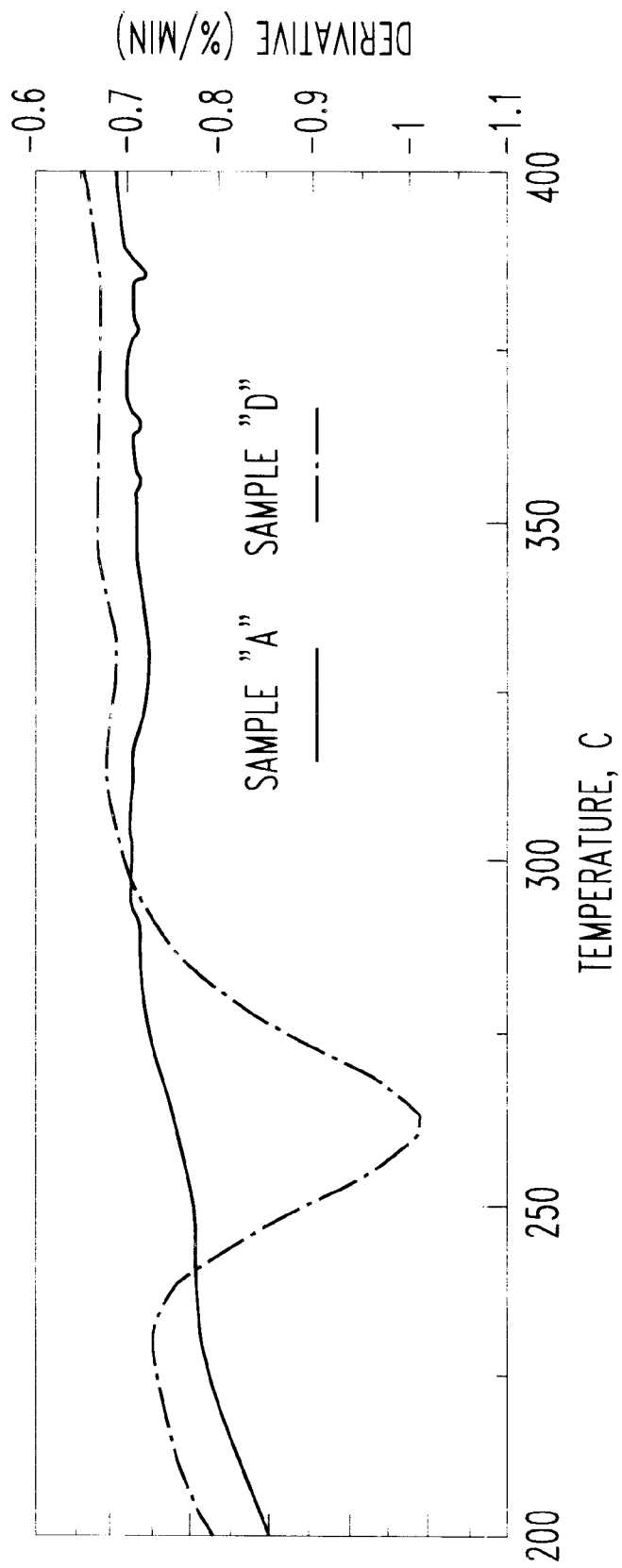
FIGS. 1 and 2 show differential thermogravimetric analysis (DTG) curves showing the amount of bayerite formed before and after curing.

In accordance with the invention, there is provided a method for producing alumina bodies having alkali or alkaline earth metal compounds or their oxides, e.g., sodium or sodium compounds such as sodium aluminate incorporated in the bodies. The method comprises using a source of activated alumina powder and an aqueous solution having a pH of about 12 to 14, the solution having metal hydroxide, e.g., NaOH or KOH, dissolved therein. The activated alumina powder is formed into alumina bodies, e.g., rounded bodies, using the high pH aqueous solution to bond particles of the alumina powder together by rehydration. Using the high pH solution results in efficiently incorporating substantial levels of the alkali or alkaline earth metals or their oxides into the alumina body to provide for improved properties such as increased surface area and crush strength.

The activated alumina referred to includes alumina having a surface area usually greater than 100 m$^2$/g and typically in the range of 100 to 400 m$^2$/g. Further, the activated alumina powder is preferably obtained by rapid dehydration of aluminum hydroxides, e.g., alumina trihydrate or hydrargillite in a stream of hot gasses or solid heat carrier. Dehydration may be accomplished in any suitable apparatus using the stream of hot gases or solid heat carrier. Generally, the time for heating or contacting with the hot gases is a very short period of time, typically from a fraction of a second to 4 or 5 seconds, for example. Normally, the temperature of the gases varies between 400° and 1000° C. The process is commonly referred to as flash calcination and is disclosed in U.S. Pat. No. 2,915,365, incorporated herein by reference. However, other methods of calcination may be employed.

The activated alumina suitable for use in the present invention for forming agglomerates has a median particle size in the range of 0.1 to 300 microns, preferably 1 to 100 microns and typically 1 to 20 microns. In certain instances, it may be desirable to use a median particle size of 1 to 10 microns. The activated alumina typically has an LOI (loss of ignition) in the range of about 5 to 12% at a temperature of 200° to 1000° C. The alumina may be ground to the desired particle size before or after activation.

One source of activated alumina is gibbsite which is one form of alumina hydrate derived from bauxite using the Bayer process. However, alpha alumina monohydrate, pseudoboehmite or the alumina trihydrate may be used if sufficiently calcined. Other sources of alumina may also be utilized including clays and aluminum alkoxides.

For purposes of the present invention, the aqueous solution is provided at a pH of at least 12, preferably a pH of at least 12.5 and further preferably the pH should be in the range of about 12.5 to 14. Typically, the pH of the aqueous solution is provided in the range of about 12.7 to about 13.8. For purposes of providing sodium containing alumina, the pH of the aqueous solution may be obtained by the addition of sodium hydroxide. That is, sufficient sodium hydroxide is added to the aqueous solution to provide the desired pH. If it is desired to provide potassium containing alumina, the pH of the solution may be obtained by the addition of potassium hydroxide. Also, for purposes of providing alumina bodies containing more than one metal or metal oxide, such as sodium and potassium, the pH of the solution can be adjusted by adding both metal hydroxides, for example, sodium hydroxide and potassium hydroxide, and such is contemplated within the perview of the invention.

Also, for purposes of increasing the rate of reaction, the temperature of the aqueous solution can be applied to the alumina bodies or during the forming of the alumina bodies at a temperature from room temperature to about 200° F., typically 100° to 190° F., with a preferred temperature range being 120° to 160° F.

For purposes of incorporating or modifying the activated alumina with alkali, alkaline earth metal or a compound containing the alkali or alkaline earth metal, e.g., sodium or sodium-containing compound contained in an aqueous solution, the activated alumina is treated with the aqueous solution in the pH range set forth above. For example, the activated alumina can be mixed with the aqueous solution to provide a viscous slurry. The slurry can be extruded thereby providing pellets or agglomerates of the activated alumina and the sodium in the solution. Alternatively, the slurry can be formed into spheres by the oil drop method.

In another method, the aqueous solution is brought in contact with the activated alumina during the step of forming the activated alumina into rounded bodies such as spheres, for example. This method of forming rounded bodies or agglomerates involves the use of a rotating pan or pan nodulizer wherein activated alumina powder is fed to the pan at a steady rate. Concurrently with feeding the alumina to the pan, the aqueous solution is sprayed on the activated alumina bodies or agglomerates as they are formed. Thus, activated alumina powder is steadily turned into bodies or agglomerates having alkali or alkaline earth metal compounds combined therewith.

While the preferred method of forming activated alumina bodies containing, for example, Na or Na-containing compounds is the use of a pan nodulizer, it should be understood that any method of incorporating a sodium promotor into the bodies of alumina may be used. For example, bodies comprised of activated alumina may be treated with the high pH solution.

The use of a high pH aqueous solution in accordance with the invention has the effect of delivering substantial levels of alkali or alkaline earth metal such as sodium or sodium-containing compound to the alumina surface to permit reaction with the alumina. While the inventor does not wish to be bound by any theory of invention, it is believed that the high pH as well as delivering Na to the activated alumina surface has the effect of promoting a reaction between alumina and the alkali metal, e.g., sodium. The high pH is believed to have a combination of effects. That is, the alumina is dissolved layer by layer in the alkaline solution and then the more insoluble and stable bayerite is re-precipitated on the remaining surface area. At higher pH, the dissolution and re-precipitation reaction is accelerated. As a result, less original calcined alumina grains remain and more cementation bonds of bayerite or pseudo-boehmite are formed between residual calcined alumina grains. In addition, it is believed that the reaction between alkali metal hydroxide, e.g., sodium hydroxide, and alumina leads to an aluminate surface species, e.g., sodium aluminate, upon heating to activation. The formation of soluble sodium aluminate is also accelerated by a high pH. The higher levels of bayerite formation can be measured by thermal gravimetric analysis or x-ray diffraction analysis.

A higher level of bayerite results in a higher BET surface area in alumina nodules or alumina bodies formed by the process of this invention. Also, a higher level of bayerite in the as-formed or fresh alumina bodies stimulates formation of additional bayerite upon curing. Upon activation, the bayerite decomposes to an eta-alumina phase which is a higher surface area material.

In the present invention, increased bayerite results in increased crush strength of the nodules. This results from the increased cementatious bonding provided by the bayerite material.

Nodules made by the process of the invention can have an increased level of inertness. The higher levels of sodium, for example, in a form of surface aluminate, provides for more effective neutralization of alumina acid sites. That is, it is believed that the strongest acid sites are involved in aluminate formation. Thus, the more effective neutralization of the acid sites on the alumina leads to a higher level of inertness in the activated alumina nodules or bodies.

In the present invention, it has been discovered that the sodium, calculated as sodium oxide ($Na_2O$) can be increased substantially as the pH is increased in accordance with the invention. Thus, the $Na_2O$ content can be increased from about 0.3 wt. % at a pH of 12 to about 1.3 wt. % at a pH of 13 when formed, for example, by pan nodulizing.

After formation, the alumina bodies are cured or dried for purposes of rehydration which can occur from room temperature to temperatures up to about 200° C. Further, the time for curing can range from a few minutes up to 25 hours or more, depending on the conditions. During curing, water may be added for purposes of rehydration. Normally, when the alumina bodies are formed from a viscous slurry or by spraying as noted above, sufficient water is present for purposes of rehydration to provide cured bodies. In some instances, it may not be necessary to dry or cure the bodies prior to activation. It should be noted that high pH liquid or aqueous solution present in the alumina bodies causes faster curing and consequently a higher bayerite phase when compared to the level of bayerite in alumina bodies formed using a lower pH solution.

After curing, the bodies are heated for purposes of activating and removing water of hydration. Typically, the bodies are heated to provide bodies with an LOI in the range of about 2 to 6%. Normally, the bodies are heated at a temperature in the range of about 275° to about 600° C. for removing water of hydration to the desired level. Time at temperature can range from 5 to 70 minutes. The ranges given herein are inclusive of all the numbers within the range as if specifically set forth.

When sodium hydroxide solutions are used in accordance with the invention, activated alumina bodies formed have a surface area in the range of 300 to 450 $m^2/g$ at sodium (sodium oxide) levels of 0.3 to 7 wt. %, e.g., 0.3 to 1.3 wt. %. Further, the bodies have a macro-pore volume distribution of at least 0.05 cc/g at a pore diameter of 750 Angstroms and a total pore volume of at least 0.2 cc/g.

While the invention has been described particularly with respect to the use of a sodium hydroxide or other water soluble or alkaline earth compounds contained in aqueous solution, it should be understood that the invention can include other materials. For example, when it is desired to increase the alkali metal content beyond, for example 1.2 or 1.3 wt. % Na (as $Na_2O$), even beyond 1.6 wt. % $Na_2O$, soluble metal salts of organic compounds can be used. That is, water soluble, alkali or alkaline earth metal salt of an organic compound can be incorporated in the aqueous solution. Highly suitable organic salts can include Na, K and Li organic salts. Typically, such salts include carboxylic acid salts, including mono-, di- and tri-carboylic acids. The organic part of the organic salt must be capable of decomposing upon heating, for example, during curing or activating. Normally, the carboxylic acid will not include more than 5 carbon atoms. Such salts can include Na, K and Li salts of formates, acetates, proprinates or butyrates. Na formnate, acetate or proprionate is the organic salt that is highly suitable for incorporating at the high pH range. Na acetate is particularly suitable.

When a combination solution of alkali or alkaline earth metal hydroxide and alkali or alkaline earth metal salt of an organic compound is used, the concentration of each may be varied depending on the amount of metal compound, e.g., $Na_2O$, desired in the alumina bodies. For example, the amount of sodium acetate and sodium hydroxide may be added to water to provide the desired concentration and pH. A substantial neutral solution can be used or a solution having a high pH may be used. Or, for example, a solution of sodium hydroxide can be neutralized with glacial acetic acid and then diluted to the desired concentration of sodium acetate and sodium can be added as necessary.

While the invention has been described with respect to relatively pure activated alumina or activated alumina derived from the Bayer process, activated aluminas having substantial levels of alkali metals or alkali metal compounds, e.g., alkali metal oxides such as $Na_2O$ incorporated therein may be used as the starting material for applying the high pH aqueous solution thereto, as noted above.

Further, activated alumina nodules or bodies containing 0.1 to 1.3 wt. % $Na_2O$ can be treated with a high pH solution in accordance with the invention. When the high pH solution utilizes a sodium hydroxide solution, the level of $Na_2O$ can be increased from about 0.1 to 1 wt. % above the initial sodium level. Thus, it will be seen that the level of $Na_2O$, for example, can be increased substantially in existing nodules or bodies by applying the sodium hydroxide solution in the pH range in accordance with the invention. Further, the level of alkali or alkaline earth metal, e.g., $Na_2O$, can be increased substantially, if the solution contains alkali or alkaline earth metal salt of an organic compound, and such is contemplated within the invention. The hydroxide solution with or without the alkali or alkaline earth metal salt of an organic compound can be applied by spraying as the nodules or bodies are circulated in a rotating pan nodulizer or the nodules or bodies can be dipped in the solution. Thereafter, the bodies are heated for purposes of activation. Similarly, the solution can be applied by spraying seed bodies of alumina on a rotating pan nodulizer simultaneously with addition of alumina powder to provide nodules or bodies having increased levels of $Na_2O$.

Alumina bodies produced in accordance with the present invention are useful as a drying agent, an adsorbent, a catalyst or catalyst support, for example. When used as an adsorbent, the bodies are very effective in removing HCl, oxides of nitrogen, organic acids, $H_2S$ and other contaminants from industrial waste streams. Because the alumina bodies of the invention have high surface area and crush strength, they are particularly effective as an adsorbent for either gas or liquid streams.

The following examples are further illustrative of the invention.

EXAMPLE 1

In this example, Gibbsite powder was flash calcined and then fed to a pan nodulizer. It was sprayed with various aqueous sodium hydroxide solutions (pH=8.3, 12.8, 13.0 and 13.2) while forming nodules. The average size of the nodules was about 3 mm in diameter. The nodules were cured at ambient temperature and then held for about 3 hours in a curing bin. The nodules were activated at 750° F. for about 1 hour. The results are provided in Table 1.

TABLE 1

| Sample | pH | BET Surface Area m²/gm | Crushing Strength† lb/mm length | $Na_2O$ wt. % |
|---|---|---|---|---|
| A | 8.3‡ NO NaOH Addition | 324 | 28 | 0.3 |
| B | 12.8 | 328 | 28 | 0.34 |
| C | 13.0 | 337 | 32 | 0.39 |
| D | 13.2 | 352 | 34 | 0.53 |

†average of 5 separate runs
‡5 × 8 mesh nodules

It will be seen that the higher pH resulted in increased surface area, crush strength and $Na_2O$ levels.

Figure 2:
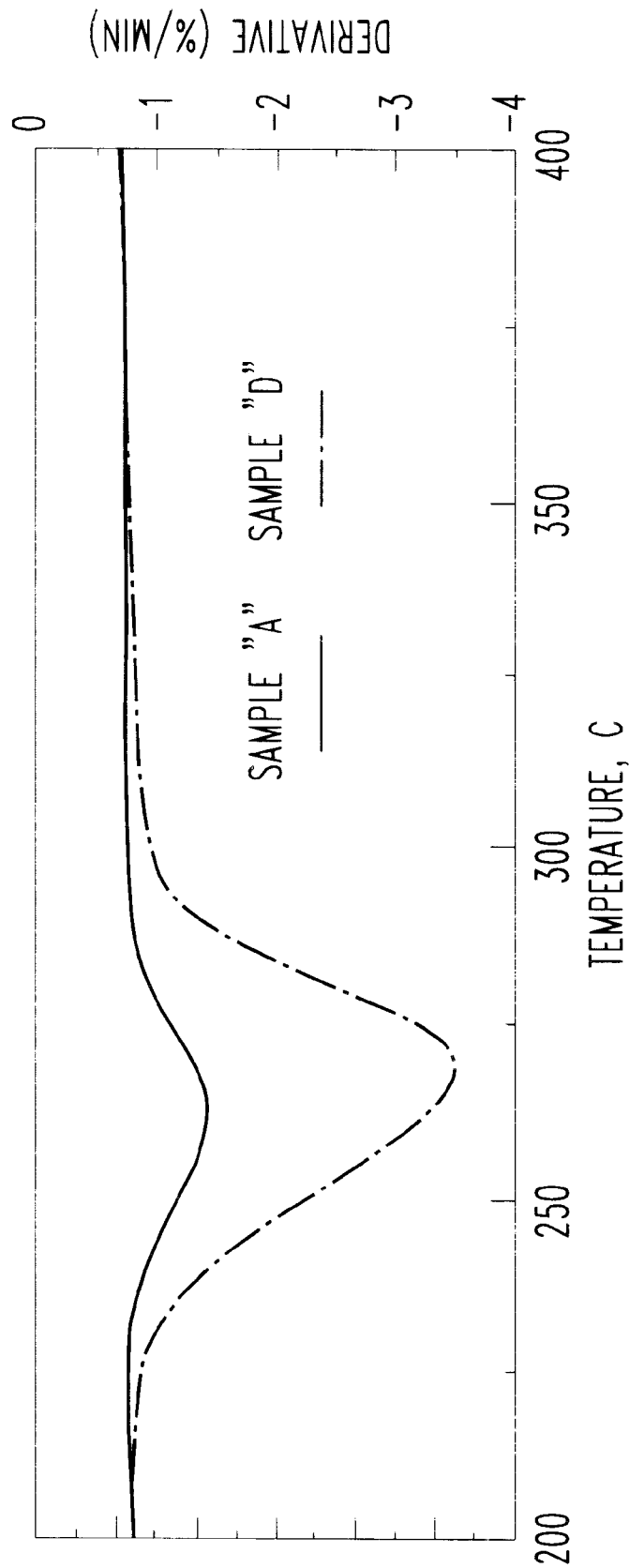

Nodules from the pan nodulizer (prior to curing) were subjected to X-ray analysis and thermogravimetric analysis (TG-DTG). FIG. 1 shows that sample D contains a substantial amount of bayerite denoted by the DTG peak at 270° C. Sample A nodulized without a sodium hydroxide addition showed that bayerite was not formed. FIG. 2 shows the amount of bayerite formed after curing. It will be noted that sample D resulted in significantly more bayerite.

EXAMPLE 2

In this example, alumina bodies were formed as in Example 1, except mixtures of sodium hydroxide and sodium acetate (Samples E and F) were used for spraying the alumina bodies as they were formed. The sodium hydroxide and sodium acetate solution was made by neutralizing a 50% sodium hydroxide solution with glacial acetic acid. This was followed by diluting the neutralized solution with water to a 6.2 wt. % sodium acetate. Then, sodium hydroxide was added to this solution to obtain a concentration of 16 grams sodium hydroxide per liter of solution. The solution mixture in Example F provided an excess of sodium hydroxide which would have provided a pH of 13.3 if added to pure water. The samples were cured for 12 hours in a curing bin at a temperature range of 30 to 60° C.

TABLE 2

| Sample | pH | BET | Crushing Strength lb/mm length† | $Na_2O$ wt. % |
|---|---|---|---|---|
| E | 7.2 | 325 | 14 | 1.25 |
| F | 13.3‡ | 355 | 19 | 1.55 |

†measured on 8 mesh balls
‡calculated from the excess sodium hydroxide

It will be seen that the level of Na measured as $Na_2O$ increased substantially while maintaining high surface areas.

EXAMPLE 3

In this example, activated alumina bodies (between 7 mesh and 12 mesh (U.S. Sieve series) comprised of sodium doped alumina (1.45 wt. % $Na_2O$) were rotated in a pan nodulizer while spraying with a solution of sodium acetate and sodium hydroxide, Sample G in Table 3. The solution contained 380 gm Na acetate/l and 4 gm NaOH/l to provide a pH of about 12.9. The alumina bodies were maintained at a temperature of about 180° F. while the solution was applied. The bodies, Sample H, were activated at 840° F. The results are shown in Table 3. It can be seen that the alumina bodies of Sample H have increased the adsorption capacity for carbon dioxide by 2.5 times compared to the same alumina bodies not treated.

TABLE 3

| Sample | $Na_2O$ wt. % | Total Pore Volume cc/g | BET m2/gm | Carbon Dioxide Adsorbed wt. % |
|---|---|---|---|---|
| G | 1.45 | 0.29 | 356 | 1.4 |
| H | 7.3 | 0.34 | 268 | 3.5 |

While the invention has been described in terms of preferred embodiments, the claims appended hereto are intended to encompass other embodiments which fall within the spirit of the invention.

What is claimed is:

1. A method of producing activated alumina bodies having alkali or alkaline earth metal compounds incorporated therein, the bodies suitable for adsorption and having increased capacity, the method comprising:
   (a) providing a source of activated alumina powder;
   (b) providing an aqueous solution having an alkali or alkaline earth metal hydroxide and a water soluble alkali or alkaline earth metal salt of an organic compound dissolved therein, the solution having a pH in the range of 6 to 13.5;
   (c) forming said activated alumina powder into bodies;
   (d) treating said bodies with said aqueous solution to provide alumina bodies having said alkali or alkaline earth metal compounds incorporated therein; and
   (e) heating said alumina bodies for purposes of activation to provide said activated alumina bodies capable of having increased adsorption capacity.

2. The method in accordance with claim 1 wherein said organic compound is an alkali or alkaline earth metal salt of a carboxylic acid.

3. The method in accordance with claim 1 wherein the alkali or alkaline earth metal hydroxide is selected from the group consisting of sodium, potassium, calcium and lithium hydroxide.

4. The method in accordance with claim 1 wherein the alkali or alkaline earth metal salt of an organic compound is selected from the group consisting of sodium, potassium and lithium salts of formates, acetates and propionates.

5. The method in accordance with claim 1 wherein the alkali or alkaline earth metal hydroxide is sodium hydroxide and said alkali or alkaline earth metal salt is sodium or potassium acetate.

6. The method in accordance with claim 1 wherein said treating with said aqueous solution is performed in a temperature range of from room temperature to 200° F.

7. The method in accordance with claim 1 including applying said aqueous solution in a temperature range of 100° to 200° F.

8. The method in accordance with claim 1 including applying said aqueous solution in a temperature range of 120° to 180° F.

9. The method in accordance with claim 1 including treating said bodies as they are being formed with said aqueous solution.

10. The method in accordance with claim 1 including the step of forming said bodies in a rotating pan.

11. The method in accordance with claim 1 wherein said treating is spraying said aqueous solution on said bodies as they are formed.

12. The method in accordance with claim 1 wherein said activated alumina bodies contain 0.3 to 7 wt. % $Na_2O$ based on the weight of alumina.

13. The method in accordance with claim 1 including the step of spraying formed alumina bodies with said aqueous solution.

14. The method in accordance with claim 1 including maintaining said formed bodies at a temperature in the range of 120° to 200° F.

15. A method of producing activated alumina bodies, the bodies having increased adsorption capacity, the method comprising:
(a) providing a source of activated alumina powder;
(b) providing an aqueous solution comprised of sodium hydroxide and a water soluble alkali or alkaline earth metal salt of an organic compound selected from one of the group consisting of sodium, potassium and lithium acetate dissolved therein, the solution having a pH in the range of 6 to 13.5;
(c) forming said activated alumina powder into bodies;
(d) as said bodies are forming, spraying said bodies with said aqueous solution to form alumina bodies having said hydroxide and acetate incorporated therein; and
(e) heating said alumina bodies for purposes of activation to provide said activated alumina bodies having increased levels of adsorption.

16. The method in accordance with claim 15 wherein said treating with said aqueous solution is performed in a temperature range of from room temperature to 200° F.

17. The method in accordance with claim 15 including applying said aqueous solution in a temperature range of 100° to 200° F.

18. The method in accordance with claim 15 including applying said aqueous solution in a temperature range of 120° to 180° F.

19. The method in accordance with claim 15 wherein the organic compound is sodium acetate.

20. A method of producing activated alumina bodies having alkali or alkaline earth metal compounds incorporated therein, the bodies having increased adsorptive capacity, the method comprising:
(a) providing a source of activated alumina powder;
(b) providing an aqueous solution having an alkali or alkaline earth metal hydroxide and a water soluble alkali or alkaline earth metal salt of an organic compound dissolved therein, the solution having a pH in the range of 6 to 13.5;
(c) mixing said powder and said solution to form a mixture and forming said mixture into bodies; and
(d) heating said alumina bodies for purposes of activation to provide said activated alumina bodies capable of having increased adsorption capacity.

21. The method in accordance with claim 20 wherein the alkali or alkaline earth metal hydroxide is sodium hydroxide.

22. The method in accordance with claim 20 wherein the alkali or alkaline earth metal salt of an organic compound is selected from the group consisting of sodium, potassium and lithium salts of formates, acetates and propionates.

23. The method in accordance with claim 20 wherein the alkali or alkaline earth metal hydroxide is sodium hydroxide and said organic compound is sodium acetate.

24. A method of producing activated alumina bodies having alkali or alkaline earth metal compounds incorporated therein, the bodies having increased adsorption capacity, the method comprising:
(a) providing formed alumina bodies;
(b) providing an aqueous solution having an alkali or alkaline earth metal hydroxide and a water soluble alkali or alkaline earth metal salt of an organic compound dissolved therein, the solution having a pH in the range of 6 to 13.5;
(c) treating said formed alumina bodies with said aqueous solution to provide alumina bodies having of said alkali or alkaline earth metal compounds incorporated therein; and
(d) heating said alumina bodies having said metal compounds incorporated therein for purposes of providing activated alumina bodies capable of having increased adsorption capacity.

25. The method in accordance with claim 24 wherein the alkali or alkaline earth metal salt of an organic compound is selected from the group consisting of sodium, potassium and lithium salts of formates, acetates and propionates.

26. The method in accordance with claim 24 wherein said formed alumina bodies contain 0.3 to 1.6 wt. % $Na_2O$ based on the weight of alumina.

27. The method in accordance with claim 24 wherein the alkali or alkaline earth metal hydroxide is sodium hydroxide and said alkali or alkaline earth metal salt is sodium or potassium acetate.

28. The method in accordance with claim 24 wherein said treating with said aqueous solution is performed in a temperature range of from room temperature to 200° F.

29. The method in accordance with claim 24 including applying said aqueous solution in a temperature range of 100° to 200° F.

30. The method in accordance with claim 24 including applying said aqueous solution in a temperature range of 120° to 180° F.

31. A method of producing activated alumina bodies having alkali or alkaline earth metal compounds incorporated therein, the method comprising:

(a) providing formed alumina bodies containing 0.3 to 1.6 wt. % $Na_2O$ based on the weight of alumina;

(b) providing an aqueous solution having an alkali or alkaline earth metal hydroxide selected from the group consisting of sodium and potassium hydroxide and a water soluble alkali or alkaline earth metal salt of an organic compound selected from the group consisting of sodium and potassium formate, acetate or proprionate dissolved therein, the solution having a pH in the range of 6 to 13.5;

(c) maintaining said bodies in a temperature range of 120° to 200° F.;

(d) treating said bodies with said aqueous solution to provide alumina bodies having said alkali or alkaline earth metal compounds incorporated therein; and (e) heating said alumina bodies having said metal compounds incorporated therein for purposes of activation to provide said activated alumina bodies capable of having increased adsorption capacity.

32. The method in accordance with claim 31 wherein said metal hydroxide is sodium hydroxide and the alkali or alkaline earth metal salt of an organic compound is sodium acetate.

* * * * *